April 29, 1941.　　　V. VOORHEES　　　2,239,801
CATALYTIC CRACKING SYSTEM
Filed Jan. 8, 1938
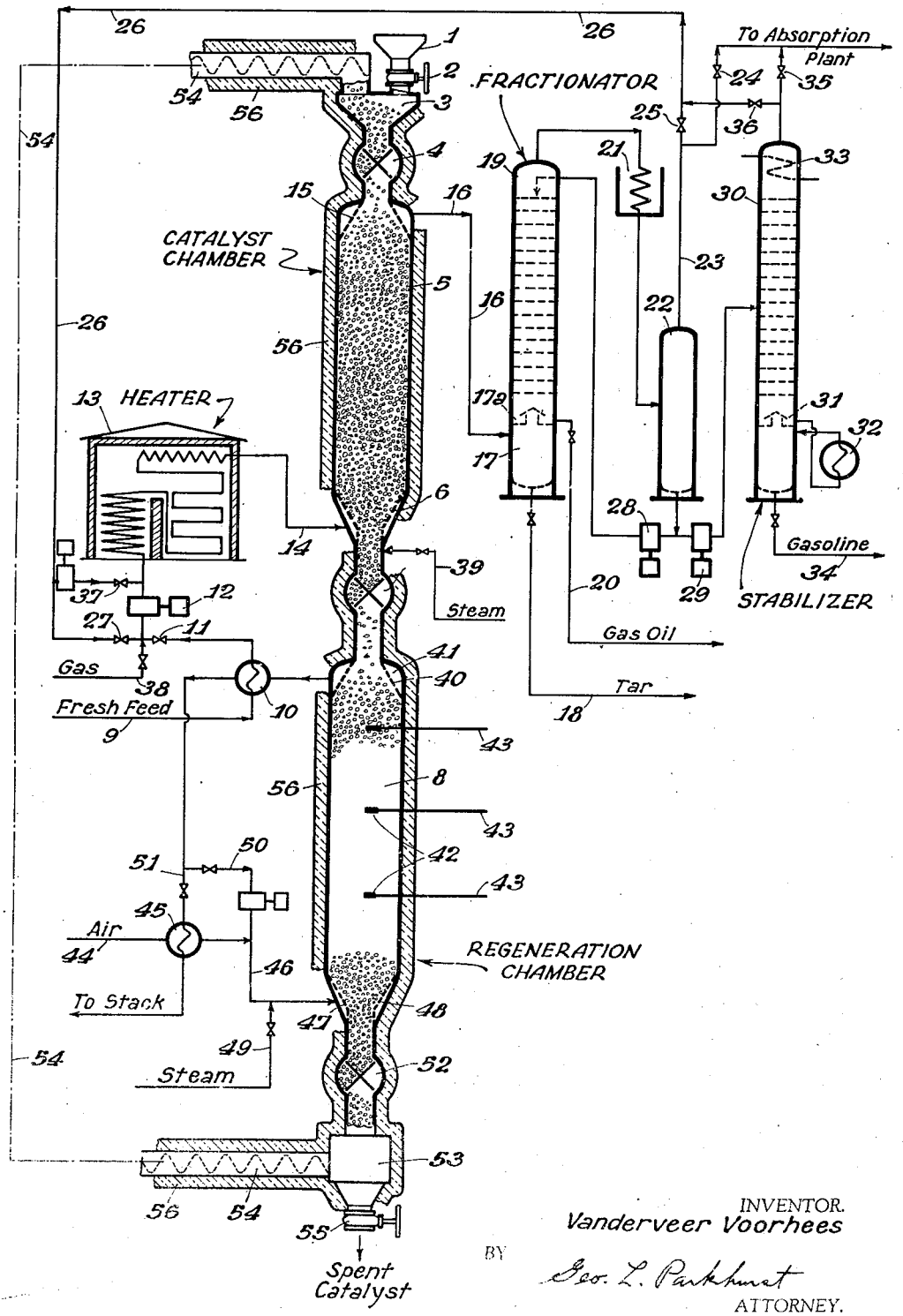
INVENTOR.
Vanderveer Voorhees
BY Geo. L. Parkhurst
ATTORNEY.

Patented Apr. 29, 1941

2,239,801

UNITED STATES PATENT OFFICE 2,239,801

CATALYTIC CRACKING SYSTEM

Vanderveer Voorhees, Hammond, Ind., assignor to Standard Oil Company, Chicago, Ill., a corporation of Indiana Application January 8, 1938, Serial No. 183,946

6 Claims. (Cl. 196—52)

This invention relates to a method and apparatus for the catalytic cracking of hydrocarbon oils.

It is an object of my invention to provide a catalytic cracking system of the continuous type. More particularly it is an object of my invention to provide a catalytic cracking system in which the catalyst moves continuously or intermittently first through a cracking zone and then through a regeneration zone and in which gases from the regeneration zone are prevented from entering the cracking zone. Another object of my invention is to provide a catalytic cracking system in which a catalyst can be used, regenerated and reused substantially without heat losses. Other and more detailed objects, uses and advantages of my invention will become apparent as the description thereof proceeds.

Catalytic cracking processes are well known in which a solid catalyst, for instance an argillaceous catalyst, is used to improve the yield and/or quality of gasoline produced by catalytic cracking. Various natural clays have this ability. Bentonite is one suitable material. Synthetic clays can also be used, for instance alumina deposited on silica, i. e. the so-called aluminum silicate catalyst. Various other solid materials, particularly metallic oxides and compounds of one or more metallic compounds are useful in connection with catalytic cracking processes. These catalysts can be used as such or deposited on granular catalyst supports.

My invention deals not with specific catalysts but with methods and apparatus for the use of solid, granular cracking catalysts and will be described with particular reference to a preferred embodiment shown in simplified, diagrammatic form in the accompanying drawing.

Referring more particularly to the drawing, a catalyst of the type previously mentioned is introduced through conduit 1 and valve 2 into hopper 3. From hopper 3 the solid catalyst passes continuously or at short intervals through valve 4 which is rotated by means not shown. This valve is preferably more or less gas tight but since the system is normally operated at substantially atmospheric pressure it is not essential that the valve be absolutely gas tight.

The catalyst descends within insulated catalyst chamber 5 in countercurrent to a rising stream of hydrocarbon gases being cracked. As the catalyst descends it becomes more and more thoroughly spent. Ultimately it passes frusto-conical screen 6 and thence through rotating valve 7 into regeneration chamber 8.

Turning to the charging stock, this is introduced from a source, not shown, through line 9, heat exchanger 10, valve 11 and pump 12 into the coils of pipe heater 13. This feed can be any conventional charging stock but is preferably a virgin charging stock, for instance a virgin heavy naphtha or a virgin gas oil. As a rule the charging stock boils at least predominantly between about 200° F. and about 750° F. After passing through the coils of pipe heater 13 the hot vapors are conveyed by means of transfer line 14 to the space between screen 6 and the lower portion of the wall of chamber 5. Passing through the screen the vapors ascend, as previously indicated, in countercurrent to the descending catalyst.

Heater 13 is, of course, so operated as to maintain the desired temperature within catalyst chamber 5. This temperature can suitably be about 900° F. Other temperatures can be used ranging in general from about 800° F. to about 1100° F.

The cracked vapors at the top of catalyst chamber 5 pass out of contact with the catalyst through frusto-conical screen 15 and thence through transfer line 16 to evaporator 17 from which tar is withdrawn through valved line 18. The material entering the evaporator can, of course, be quenched if desired.

Materials lighter than tar, including normally-gaseous constitutents, gasoline and gas oil, pass in vapor form upward through trap-out plate 17a into bubble tower 19 which is shown unitary with evaporator 17. A gas oil bottom is withdrawn from trap-out plate 17a through valved line 20 and is preferably removed from the system although all or part of this material can be recycled to the cracking operation.

From the top of bubble tower 19 materials lighter than gas oil, more specifically gasoline and normally-gaseous components, pass overhead through condenser 21 into separating drum 22. Condenser 21 is operated to condense as large a proportion of the material as possible but since the system as thus far described is operated preferably at a pressure of the order of magnitude of atmospheric pressure, the condensation effectuated by condenser 21 is not very complete. Gases pass overhead from separator 22 through line 23. These gases will usually contain fixed gases, condensable gases and some gasoline components. They are therefore preferably passed through valve 24 to an absorption plant (not shown) wherein gasoline components are recovered. However, it will be understood that all or a portion of these gases can be recycled back to heater 13 through valve 25, line 26, valve 27 and pump 12, if desired. By recycling these gases a gas reversion type of operation is obtained.

The condensate in separator 22 is removed from the base thereof and a portion is returned to the top of the bubble tower 19 as reflux by means of reflux pump 28. Another portion has its pressure boosted by means of pump 29 and is introduced into stabilizer 30. This stabilizer can suitably be operated at a pressure of from about 200 pounds per square inch to about 400 pounds per square inch, for instance about 300 pounds per square inch. It is equipped with the usual reboiler comprising trap-out plate 31 and heater 32 and is also equipped with dephlegmating coil 33. From the base of stabilizer 30 stabilized gasoline is removed through valved line 34 for storage, use or further treatment as desired.

Some four carbon atom hydrocarbons in excess of what is desired in the stabilized gasoline and also some three carbon atom hydrocarbons are to be found in the condensate in separator 22 since this separation is rather crude. These gases pass overhead from stabilizer 30 and can be sent to the absorption plant previously mentioned through valve 35. However, they can suitably be recycled to heater 13 through valve 36, line 26 and valve 37. The presence of these gases in reaction zone 5 promotes certain polymerization and alkylation reactions and improves the quantity and quality of gasoline produced.

Additional gases, preferably gases rich in olefinic hydrocarbons such as propene, can advantageously be introduced through valved line 38.

Steam can be introduced with the charge to the cracking operation or can suitably be introduced through valved line 39. Steam introduced at this point insures the volatilization of any volatile material which might otherwise remain on the catalyst passing to the revivification zones.

Passing the point of steam injection, the spent catalyst is transferred continuously or intermittently into revivification chamber 8, as previously described, by means of valve 7 which is rotated by means not shown. Valve 7 is preferably approximately gas tight but need not be entirely so since there is normally no substantial pressure differential across it. However, the presence of valve 7 at this point is highly important since otherwise a portion of the revivification gases pass into the cracking reaction zone and seriously interfere with the cracking reaction.

The top of revivification chamber 8 is provided with frusto-conical screen 40 which defines a catalyst-free space 41 from which revivification gases are removed.

As the catalyst descends in chamber 8, it passes countercurrent to an ascending stream of revivification gases. These gases contain oxygen but preferably contain oxygen in a more dilute form than air. Thus, for example, a mixture of air and flue gas or a mixture of air and steam or a mixture of air, flue gas and steam can be used. The purpose of the revivification gas is to burn away the coke deposited on the surface of the catalyst. However, local overheating is very injurious to the catalyst and for this reason the revivification operation must be carefully controlled. This control can be accomplished by controlling the oxygen concentration, the temperature of the gas introduced, its rate of passage through the chamber, and other variables familiar to those skilled in the art.

The revivification reaction is, of course, exothermic and it may be necessary in starting up my apparatus to use practically pure heated air at the beginning and then increase the dilution of the oxygen as the apparatus comes to equilibrium.

Thermocouples 42 attached to leads 43 are disposed at various points in chamber 8 and provide the operation with a means for noting and correcting incipient local overheating. These thermocouple leads, of course, lead to a suitable type of recording instrument not shown. Similarly, measuring devices are desirable in the case of cracking reaction chamber 5.

Air is introduced from a source, not shown, through line 44, heater 45 and line 46 into the catalyst-free space 47 at the bottom of chamber 8. This catalyst-free space is defined by the lower walls of chamber 8 and by frusto-conical screens 48. Steam can be introduced with the air through valved line 49 and flue gases can be recirculated through valve 50. The remainder of the flue gases pass through valve 51 and heat exchanger 45 and thence to a stack not shown.

Thus the hot flue gases from the top of chamber 8 serve first to preheat the fresh feed passing through line 8 and then serve to preheat the air passing into the revivification chamber. If these gases contain combustible materials they can be sent to the burners of furnace 13 rather than to the stack.

When the catalyst reaches the bottom of revivification chamber 8 it passes through rotating valve 52 which can suitably be of the same general type as valves 4 and 7. Alternatively, these valves can be of other types.

From valve 52, the catalyst descends to hopper 53 from which it is conveyed while still hot by screw conveyor 54 to hopper 3 at the top of the system.

After repeated reuse, when the catalyst is no longer satisfactory, it can be removed through valve 55.

The whole catalyst system including particularly cracking chamber 5, revivification chamber 8, screw conveyor 54 and the connections between these various elements are suitably provided with heat insulation 56 as shown in fragmentary manner. By this means I am able to secure a highly efficient system since the catalyst which is heated by the hydrocarbon charging stock carries its heat with it into the revivification chamber which can suitably be operated at about 1000° F. and the hot material from the base of the revivification chamber is transferred directly to the top of the catalyst chamber without substantial heat losses. Furthermore, the heat generated by the revivification reaction is utilized efficiently in preheating the streams charged to the system.

While I have described my invention in connection with a specific embodiment thereof, it is to be understood that this is by way of illustration and not by way of limitation and I do not mean to be limited thereby but only to the scope of the appended claims which should be construed as broadly as the prior art will permit.

I claim:

1. Apparatus for continuous catalytic cracking of hydrocarbon oils comprising a pipe still for heating said oils to a temperature of about 800 to 1100° F., a cracking chamber provided with a granular catalyst inlet and a granular catalyst outlet and also provided with a charging stock inlet and a cracked product outlet, said inlets and said outlets being positioned at opposite ends of said chamber, a transfer line connecting said charging stock inlet with said pipe still, a fractionating system, means for introducing products from the cracked product outlet to said fractionating system, a revivification chamber provided with a granular catalyst inlet and a granular catalyst outlet and also with a revivification medium inlet and a revivification medium outlet, said last-mentioned inlets and said last-mentioned outlets being positioned at opposite ends of said revivification chamber, means for transferring hot spent granular catalyst from said cracking chamber outlet to said revivification chamber inlet while the cracking and revivification operations are in progress, said means comprising a valve adapted to transfer granular catalyst while preventing substantial gas flow between said two chambers, and means for transferring hot revivified granular catalyst from said revivification chamber outlet to said cracking chamber inlet while the cracking and revivification operations are in progress, said last-mentioned means comprising at least one valve adapted to transfer granular catalyst while preventing substantial gas flow between said two chambers.

2. Apparatus for continuous catalytic cracking of hydrocarbon oils comprising a pipe still for heating said oils to a temperature of about 800 to 1100° F., a cracking chamber provided with a catalyst inlet and a catalyst outlet and also provided with a charging stock inlet and a cracked product outlet, a transfer line connecting said charging stock inlet with said pipe still, a fractionating system, means for introducing products from the cracked product outlet to said fractionating system, a revivification chamber provided with a catalyst inlet and a catalyst outlet and also with a revivification medium inlet and a revivification medium outlet, means for transferring hot spent catalyst from said cracking chamber outlet to said revivification chamber inlet while the cracking and revivification operations are in progress, said means comprising a valve adapted to transfer catalyst while preventing substantial gas flow between said two chambers, means for transferring hot revivified catalyst from said revivification chamber outlet to said cracking chamber inlet while the cracking and revivification operations are in progress, said last-mentioned means comprising at least one valve adapted to transfer catalyst while preventing substantial gas flow between said two chambers, and heat exchange means for utilizing the hot revivification chamber outlet material to preheat material passing to at least one of said inlets.

3. A system for the catalytic conversion of petroleum hydrocarbons which comprises a substantially vertical conversion chamber, means including a substantially gas-tight valve above said chamber for admitting catalyst thereto and preventing vapor loss therefrom, means including a substantially gas-tight valve below said chamber for maintaining said chamber substantially full of catalyst material and for discharging catalyst therefrom at substantially the rate at which it is introduced thereto, means for continuously heating hydrocarbon vapors to a temperature of 800 to 1100° F. and for passing said heated vapors through said chamber, a fractionating system, means for introducing products from said conversion chamber to said fractionating system, a catalyst regeneration chamber, means including the second-named substantially gas-tight valve below said conversion chamber for admitting spent catalyst from said conversion chamber to said regeneration chamber and for preventing gases and vapors from the regeneration chamber from gaining access to said conversion chamber, means including a third gas-tight valve below the regeneration chamber for discharging regenerated catalyst therefrom at substantially the rate at which it is introduced thereto while preventing the escape of regeneration gases and vapors and means for returning regenerated catalyst discharged through said third-named gas-tight valve for introduction through said first-named gas-tight valve.

4. The apparatus of claim 1 which includes a foraminous wall in said cracking chamber at the charging stock inlet for distributing introduced vapors into the catalyst material.

5. The method of converting a hydrocarbon oil boiling predominantly between 200° F. and 750° F. into high quality gasoline by a process comprising catalytic cracking which method comprises heating said oil to effect vaporization thereof and to effect super-heating of the vapors to a temperature of 800° F. to 1100° F., introducing said super-heated vapors into a moving bed of catalyst in a conversion zone, introducing catalyst into said zone and removing catalyst from said zone without appreciable losses of hydrocarbon vapors with said catalyst, continuously regenerating said removed catalyst in a separate zone at high temperature and returning said high temperature regenerated catalyst to said conversion zone in admixture with fresh catalyst, preventing regeneration gases from entering the conversion zone, and fractionating the products from the conversion step into a gasoline fraction, a gas fraction and at least one heavier-than-gasoline fraction.

6. The method of claim 5 which includes the further step of vaporizing adsorbed oil from catalyst prior to its transfer from the conversion zone to said regeneration zone by contacting said catalyst with a hot inert gas.

VANDERVEER VOORHEES.

DISCLAIMER 2,239,801.—*Vanderveer Voorhees*, Hammond, Ind. CATALYTIC CRACKING SYSTEM. Patent dated April 29, 1941. Disclaimer filed August 9, 1943, by the assignee, *Standard Oil Company*.

Hereby enters this disclaimer to claims 1, 3, and 4 in said specification.

(*Official Gazette September 7, 1943*).